United States Patent Office 3,450,376
Patented June 17, 1969

3,450,376
DEVICE FOR RIGID FASTENING OF CARGO TO AIRCRAFT PARTICULARLY TO HELICOPTER-CRANE FOR TRANSPORTING THIS CARGO
Nikolai Grigorievich Rusanovich, 3 Rybinskaya ulitsa 12, kv. 6; Ivan Sergeevich Dmitriev, Kutuzovsky prospect 13, kv. 163; Yakov Vasilievich Korobov, 3 Rybinskaya ulitsa 30, kv. 4; Shmul Ovshievich Volfenzon, Bolotnikovskaya ulitsa 38, korpus 1, kv. 127; Boris Jurievich Kostin, Kholzunov per. 18, kv. 416; Evgeny Bentsionovich Zaichik, Bolshaya Cherkizovskaya ulitsa 3, korpus 5, kv. 67; and Vasily Semenovich Emelyanov, Mytischi Moskovskoi oblasti, ulitsa Schelkovskaya, 1, all of Moscow, U.S.S.R.
Filed Oct. 18, 1965, Ser. No. 497,173
Int. Cl. B64c *1/22;* B60p *3/00*
U.S. Cl. 244—137                                6 Claims

ABSTRACT OF THE DISCLOSURE

A structure composed of a plurality of fluid operated struts of adjustable length, some of which are provided with a gripper at one end to engage elements mounted on an object to be supported by a helicopter or the like, these struts being articulated to the helicopter at their other ends, and two of the other struts control the position of at least two of the struts that are provided with a gripper, so that an object lifted and positioned by said struts is rigidly supported by said helicopter, by a tripod, and the several struts are each provided with locks to prevent inadvertent change of length of the struts.

---

Figure 1:
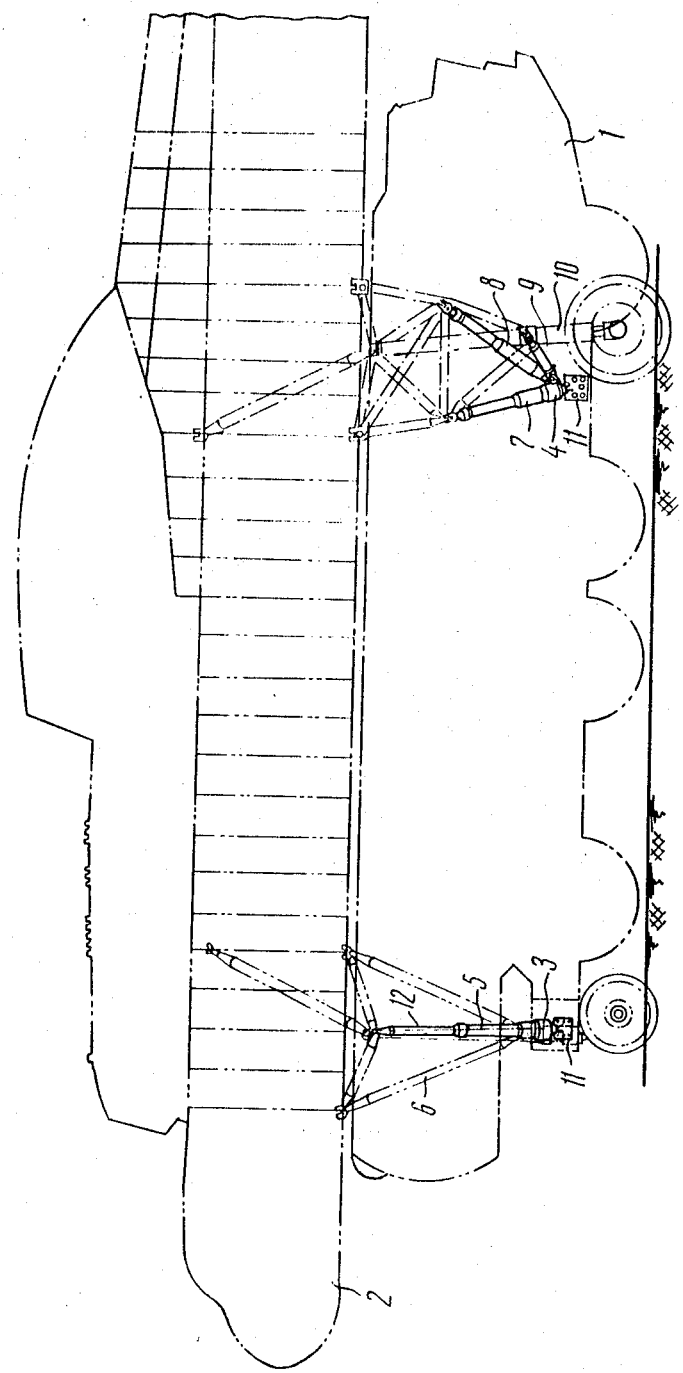

The present invention relates to devices used for hoisting and fastening cargo, and more particularly to devices for rigid fastening of cargo to aircraft and especially to a helicopter-crane.

The known devices for fastening cargo transported by helicopter-cranes comprise either rope winches with grippers mounted on the helicopter or grippers secured to rigid hoisters suspended to the helicopter.

It has been found that in order to lift the maximum load it is necessary for a helicopter to take off much as an ordinary airplane does by running at high speed on a runway. This manner of taking off increases the possible load by fifty percent over the possible vertical lift. It has been found, however, that the known means to support a cargo, such as a wheeled vehicle or the like, will not permit such a takeoff. This distinct disadvantage of the known cargo hoists and securing means is overcome by the present invention.

Another disadvantage to said devices with rope winches is the necessity to employ numerous and various complex housings and attachments for hoisting cargo and fastening it to the helicopter fuselage by the upper part which is normally not adapted for this purpose.

The known devices with grippers secured to rigid hoisters mounted on the helicopter do not provide for fastening cargo of various sizes and shapes and with various arrangements of fastening elements.

One of disadvantages common to the known devices is that they do not provide for a simultaneous disengaging of all the grippers as is essential for dropping the cargo in case of emergency.

Another disadvantage common to the known devices is that the positioning of the grippers to the fastening elements mounted on the cargo is carried out by hand which is both difficult and dangerous for the personnel and results in waste of time.

One object of the present invention is to eliminate the above-mentioned disadvantages.

The main object of the present invention is to provide a device for rigid fastening of cargo transported by helicopter-crane by elements on the cargo near its bottom part or at least on its frame or strength element, in such a position that it does not touch the fuselage of the helicopter; to provide for emergency dropping of cargo; to provide for mechanical positioning of the grippers to the fastening elements of the cargo; and to provide for fastening cargo of different sizes and shapes and with various arrangements of fastening elements.

This object is achieved by the employment of a device which includes front and rear grippers mounted on hoisters articulated to the helicopter, and in which hydraulically operated grippers are connected in series in a hydraulic system, which provides for their simultaneous disengaging for dropping the cargo in case of emergency.

Each of the rear grippers is fixed in a joint in which three hoisters are brought together to form a tripod, which provides for a mechanical positioning of the grippers to the fastening elements mounted on the cargo.

To adjust the hoisters with front grippers in accordance with the shape and size of the cargo, the front grippers may be made removable so that they can be articulated in different places on the helicopter.

Figure 3:
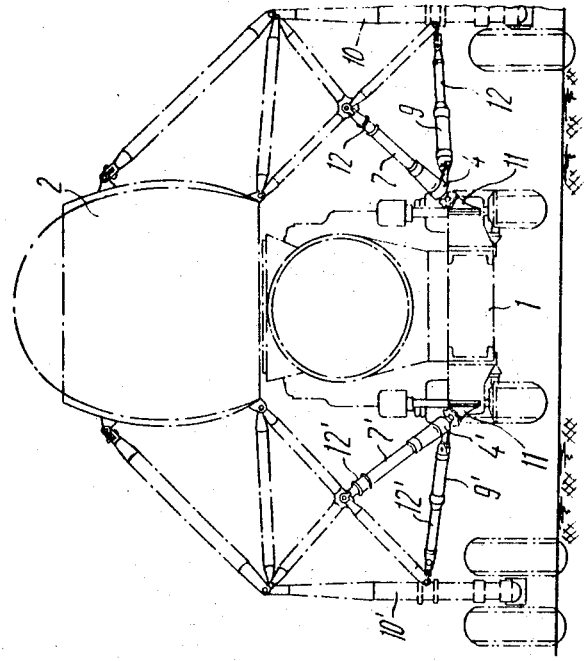
Figure 2:
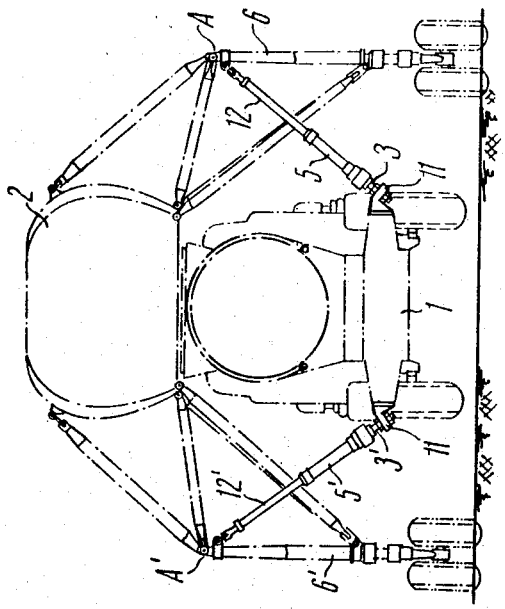
Figure 4:
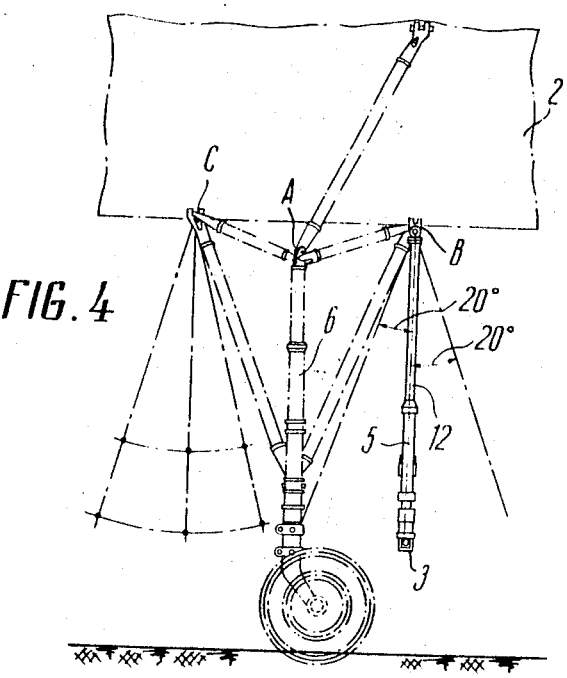
Figure 5:
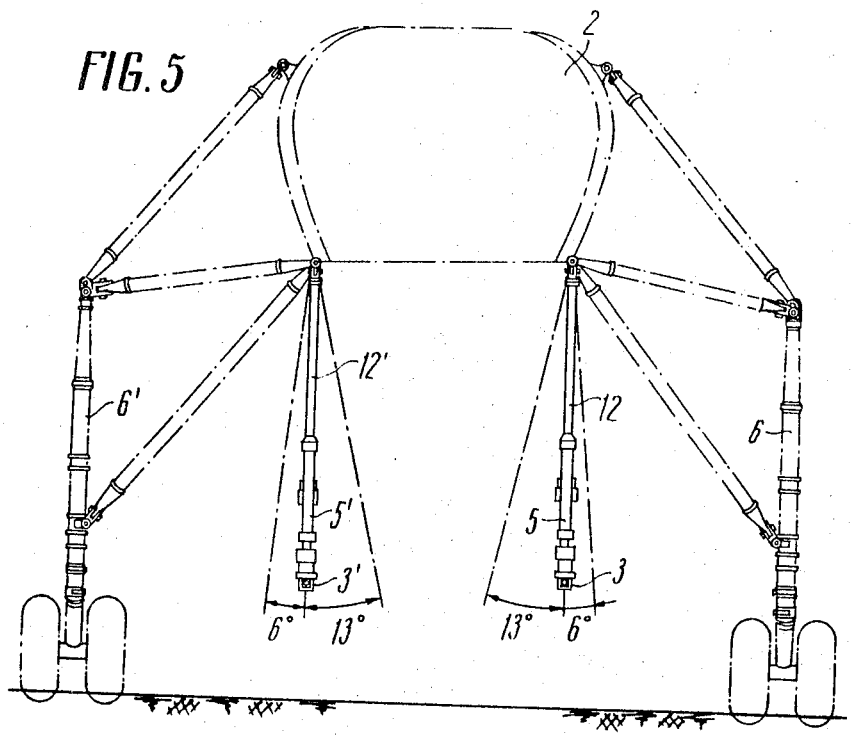
Figure 6:
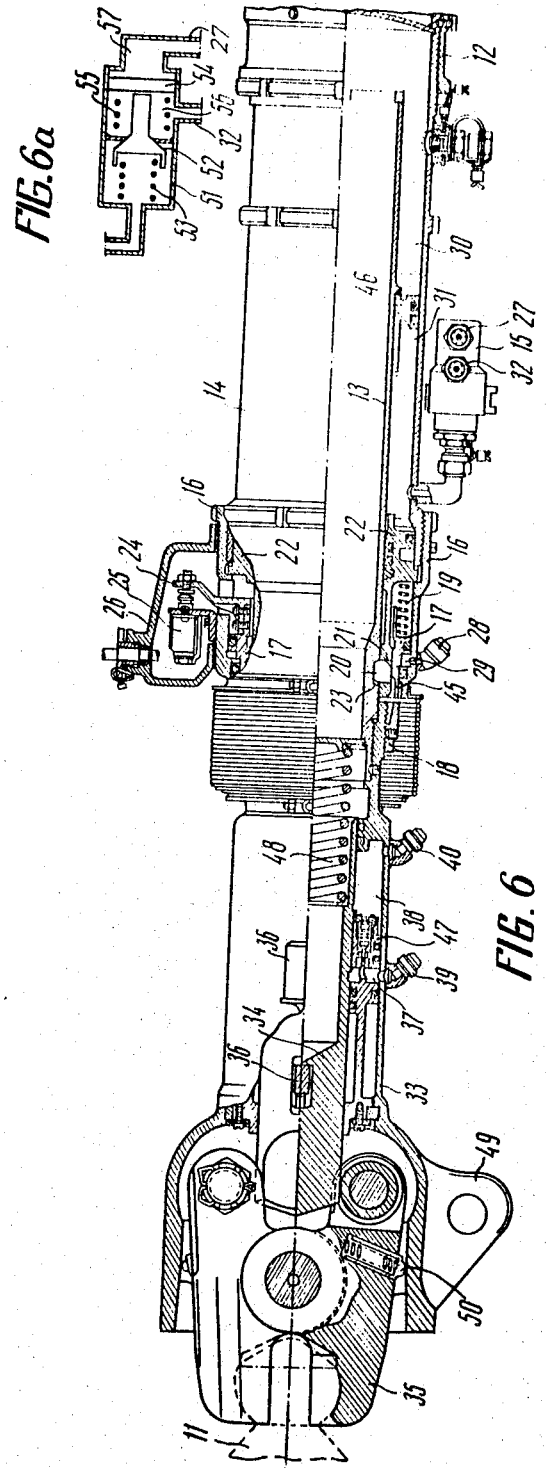
Figure 7:
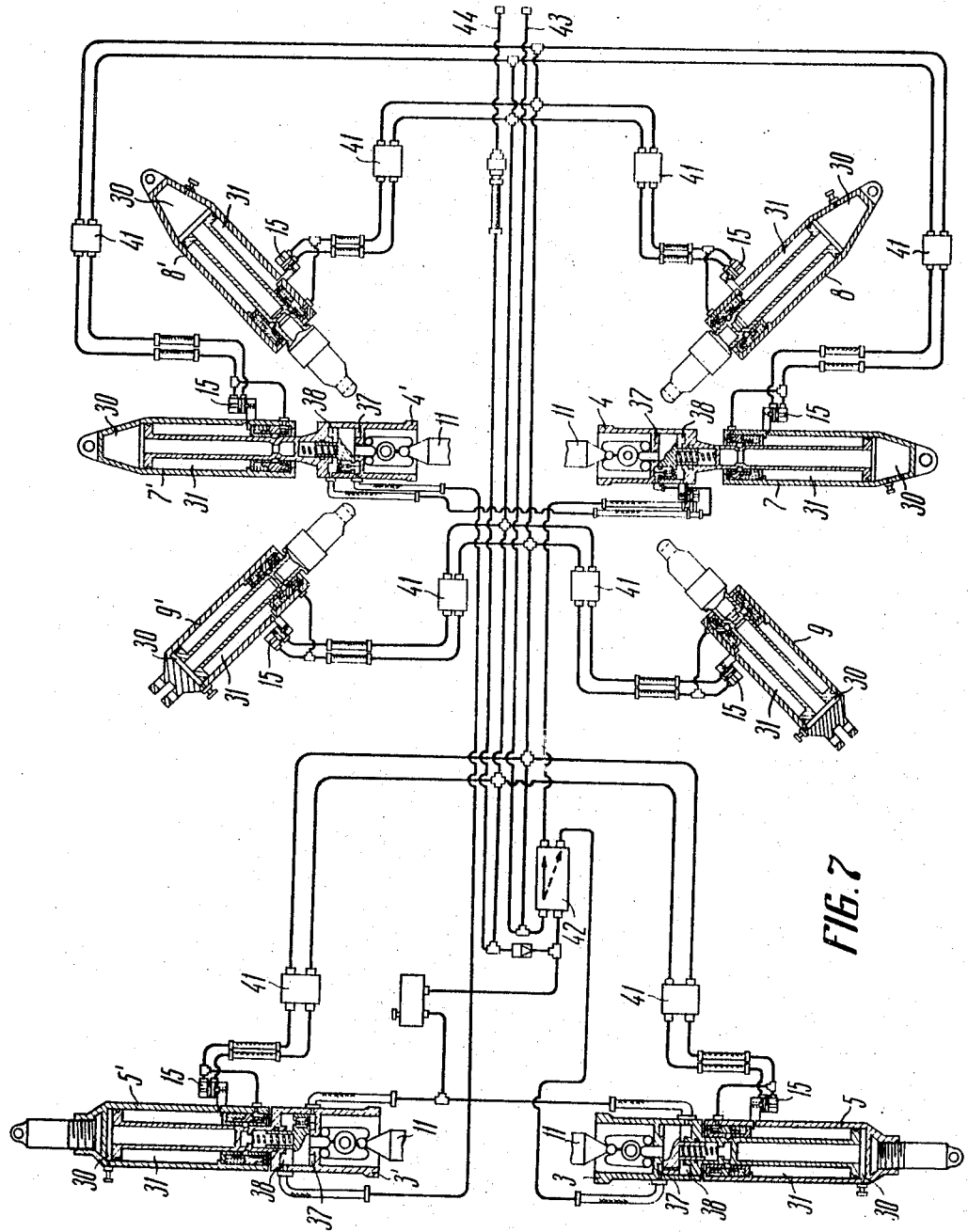

If necessary, all the hoisters may be provided with removable adapters, preferably telescopically adjustable ones. An embodiment of the invention is shown in the accompanying drawings, in which:

FIG. 1 is a diagrammatic side view of the device for fastening cargo to the helicopter-crane;
FIG. 2 is a front view of front grippers;
FIG. 3 is a front view of rear grippers;
FIG. 4 is a side view of possible flight positions of hydraulic hoisters with front grippers;
FIG. 5 is a front view of FIG. 4;
FIG. 6 is a partial longitudinal section of the general view of a hydraulic hoister with a gripper;
FIG. 6a is a diagrammatic view of valve 15 in section;
FIG. 7 is a top exploded diagrammatic view of the hydraulic system of the device.

The undercarriage, or chassis, 6, 6', 10, 10' is in the form of a gantry which can straddle the cargo to be carried which, in FIGS. 1, 2 and 3, is shown to be a wheeled vehicle.

As shown in FIGS. 1, 2 and 3 a device for fastening cargo 1 to the helicopter-crane 2 comprises two front grippers 3 and 3' and two rear grippers 4 and 4' fixed on hydraulic hoisters articulated to the helicopter.

The front grippers 3 and 3' are fixed on hoisters 5 and 5' articulated to the helicopter near the front chassis 6 and 6', and the rear grippers 4 and 4' are fixed on the main hoister and are located at the vertices of the pyramids or tripod formed by the main hoisters 7 and 7', rear hoisters 8 and 8', and front hoisters 9 and 9'.

The hoisters 7 and 7', struts 8 and 8', and strusts 9 and 9' are articulated to the carrier beams 10 and 10' of the rear chassis of the helicopter.

Hoisters 5 and 5' having the front grippers 3 and 3' are made removable and may be articulated to the helicopter in points A and A' and also, depending on the arrangement of the elements 11 fixed on the cargo 1, in point B or C of the helicopter (see FIG. 4).

The length of the hoisters is adjusted by means of adapters 12 and 12' which are telescopic so that the fluid operated portion of the hoisters may be of a minimum length.

When flying without cargo, the rods of the hoisters are completely retracted and hoisters 5 and 5' are fixed by their free end portions to the front chassis 6 and 6' of the helicopter.

The hydraulic hoister with a gripper (see FIG. 6) comprises said adapter 12, rod 13, cylinder 14, hydraulic lock 15, body of mechanical lock 16, slide-valve 17, nut 18, springs 19, slide blocks 20, openings 21, boxes 22, annular groove 23, bracket 24, electric limit switch 25, casing 26, through pipes 27 and 28, spaces 29, 30 and 31, through pipe 32, casing 33 of a gripper, rod 34 of the gripper, grips 35, lever 36, spaces 37 and 38, through pipes 39 and 40.

FIG. 7 shows the communication of the pipes shown in FIG. 6, through electro-hydraulic valves 41 and 42 with supplying pipe line 43 or drain pipe line 44, said communication being necessary for performing all the necessary operations to fasten cargo to a helicopter.

Spaces 17, 37 and 38 are filled with operating liquid, space 30 is filled with compressed nitrogen. Slide valve 17 (see FIG. 6) has annular groove 45. Secured on rod 13 is piston 46, and secured on rod 34 is piston 47. Inserted between rods 13 and 34 is spring 48.

Rear grippers 4 and 4' have two pivot elements 49 used to secure rods 13 of hoisters 8, 8' and 9, 9' thereto.

Inserted into openings of grips 35 are springs 50, which by one end portion rest against grips 35, and by the other against casing 33. Hydraulic lock 15 comprises body 51, valve 52, spring 53, piston 54, spring 55 and spaces 56 and 57.

The hoister and the gripper are shown in FIG. 6 in flight position, with grips 35 closed and holding therein ball joints 11 of cargo 1, and rod 13 retracted.

Prior to positioning the gripper, comprising said body 33, secured at the end portion of rod 13, grips 35, springs 50, lever 36, rod 34, piston 47 and spring 48 (to joints 11), it is necessary to open grips 35, for which purpose the operating liquid is supplied under pressure into space 37 to force piston 47 to move together with rod 34 to the right. With rod 34 disengaged from grips 35, the grips 35 will open under the action of springs 50.

When it is necessary to release joints 11 of cargo 1 from grips 35 of the gripper, in the case of failure of the hydraulic system, rod 34 is disengaged from grips 35 by turning by hand lever 36 hinged from the outside on casing 33 and entering by one of its end portions the opening of rod 34.

To position the gripper to joints 11, it is necessary to displace rod 13 and the gripper leftward until the jaw of grips 35 is aligned with said joint 11, for which purpose the operating liquid is supplied under pressure simultaneously into space 29 of the mechanical lock of the hoister and into space 57 of lock 15. Under the action of the operating liquid piston 54 of lock 15 will move to the left pressing in the same direction valve 52 to communicate space 31 with space 56 and through pipe 32 with the draining pipe line 44 of the hydraulic system. Thereby rod 13, under the action of compressed nitrogen in space 30, exercised with respect to piston 46, tends to move to the left.

Simultaneously, under the action of the operating liquid, slide valve 17 of the mechanical lock comprising said body 16, slide valve 17, nut 18, springs 19, slide blocks 20, openings 21 and box 22, moves to the right, compressing springs 19 until annular groove 45 of slide valve 17 is aligned with openings 21 of box 22. With groove 45 and openings 21 aligned, rod 13 tending to move to the left under the action of compressed nitrogen in space 30, by its slope on annular groove 23 will force slide blocks 20 out of groove 23, thus making it possible for rod 13 to move to the left.

In the case that the hydraulic system fails and it is necessary to release rod 13, groove 23 can be relieved of slide blocks 20 by means of nut 18, which can be displaced on the thread by hand to the right until it rests against slide valve 17, and farther until groove 45 is aligned with openings 21.

With the jaw of grips 35 aligned with ball joint 11 of cargo 1, i.e. with the gripper positioned, grips 35 are closed, for which purpose the operating liquid is supplied under pressure into space 38, and space 37 is communicated with the drain pipe line 44. Under the pressure of the operating liquid in space 38 piston 47 displaces rod 34 to the left, rod 34 comes in between the "handles" of grips 35 and the latter clamp in their jaw said joints 11.

In case of failure of the hydraulic system, spring 48 prevents rod 34 from displacing and grips 35 from opening. After joints 11 are gripped by grips 35 of grippers 3, 3' and 4, 4', hoisters 5, 5', 7, 7', 8, 8', 9 and 9' by their rods 13 hoist cargo 1 and rigidly fasten it to the helicopter in a flight position as shown in FIGS. 1, 2 and 3. For this purpose space 56 of lock 15 of each of the hoisters is connected with the supply pipe line 43 of the hydraulic system, and the operating liquid supplied under pressure presses valve 52, opens it, comes into space 31, presses piston 46 and makes the latter, together with rod 13, move to the right.

Simultaneously, space 29 of the mechanical lock is in communication with the drain pipe line 44 of the hydraulic system, making it possible for springs 19 to displace slide valve 17 to the left. Slide valve 17 starts displacing to the left at the moment of the alignment of groove 23 of rod 13 displacing to the right, with openings 21 of box 22, when slide blocks 20 forced inside box 22 by the slope of groove 45 begin, under the action of springs 19 acting upon slide valve 17, to enter groove 23 of rod, 13. With slide blocks 20 in groove 23, slide valve 17 continues to move to the left until it rests against the projection of body 16, and in this position prevents by its inner cylindrical surface slide blocks 20 from coming out of groove 23. In said position, which is shown in FIG. 6, slide blocks 20 prevent rod 13 from displacing farther to the right, as well as to the left or to the right when rod 13, under the action of cargo 1, later tends to displace.

With slide valve 17 displaced to a stop, bracket 24 secured by one end portion to slide valve 17, with its other end portion protruding outside through the opening in body 16, rests by its loaded end portion against electric limit switch 25 secured on body 16 and housed in casing 26. When pressing against said limit switch 25, bracket 24 in this way closes the electric circuit of a lamp (not shown) which lights up, indicating that the mechanical lock is closed.

The lighting up of said lamp in said electric circuit having limit switches 25 of all the hoisters connected in series thereinto, indicates that the mechanical locks of all the hoisters are closed. With said signal indicating that all the mechanical locks are closed received, the supply of the operating liquid into spaces 56 of locks 15 is discontinued, and valve 52 under the action of spring 53 closes, which corresponds to the closed position of locks 15, as shown in FIG. 6.

This completes the operation of gripping, hoisting and rigidly fastening the cargo to the helicopter.

In the hydraulic system the space 37 above the piston (FIG. 7) of the left rear gripper 4 communicates with the space 38' above the piston of the right rear gripper 4'.

Said spaces of the right rear gripper 4' and right front gripper 3', of the right front gripper 3' and left front gripper 3 are intercommunicated in the same way. This successive or series communication of spaces of grippers in the hydraulic system provides for simultaneous locking of all the grippers with the pressure fluid being supplied to the space 38 above the piston of the left rear gripper 4, and pressure fluid being fed to the space 37 under the piston of the left front gripper 3 provides for their simultaneous opening, particularly in case of emergency dropping of cargo 1 during the flight.

The command for an emergency dropping comes from an electrical button mounted on the helicopter steering-wheel.

The control board of the device is connected to a plug coupling (not shown) mounted on the front chassis 6 of the helicopter.

Prior to placing the cargo under the helicopter, the rear grippers 4 and 4' must be arranged so that the cargo can be freely and conveniently placed under the helicopter.

For this purpose the rear grippers are, as a rule, drawn apart by releasing rods 13 of the main hoisters 7 and 7' and the rear hoisters 8 and 8' by means of operating of corresponding switches of the portable control board.

The cargo 1 being placed under the helicopter, the front grippers 3 and 3' are released by means of the corresponding switches on the control board and then are simultaneously positioned by hand to the joints 11 of the cargo 1.

The rear grippers 4 and 4' are simultaneously released and positioned to the joints 11 of the cargo 1 by rods 13 of the hoisters 7, 7', 8 and 8', 9 and 9' which are released by operation of corresponding switches on the control board.

Then the cargo is hoisted and fastened to the helicopter in a flight position by a signal sent by corresponding switches on the control board.

In case of emergency the emergency dropping of the cargo 1 is effected by pushing a button on the helicopter steering wheel, by command of which the electro-hydraulic valve 42 connects the space 37 under the piston of the front left gripper 3 with the supply pipe line 43 of the hydraulic system, and the space 38 above the piston of the rear left gripper 4 with the draining pipe lines 44. The rods 34 of all the grippers are thus simultaneously unlocked providing for disengagement of the grips 35 from the elements 11 on the cargo under its weight. The cargo thus released freely drops onto the ground.

What is claimed is:

1. In an aircraft of the type having a gantry type wheeled chassis to provide cargo space, a plurality of fluid operated contractable and expansible strut-like hoisters articulated by one end to said chassis in pairs at opposite sides of said cargo space, a gripper at the ends of said hoisters remote from their articulation to the chassis, each said strut-like hoister of one pair of said hoisters being provided adjacent said gripper with articulating means, two additional strut-like fluid operated means articulated to said hoister adjacent said gripper at one end and to said chassis at points remote from the point of articulation of said strut-like hoister and from each other to form with said strut-like hoister a tripod-like structure to hoist and locate an element of cargo gripped by said gripper, and positive lock means to hold said gripper rigidly in position when adjusted.

2. The device of claim 1 in which said grippers are hydraulically operated and are connected in series so that all said grippers will be released simultaneously in case of emergency.

3. The device of claim 1 in which two positive lock means are provided for each hoister, one said lock means being a hydraulically operated mechanical lock, the other being hydraulic by means of sealing a confined hydraulic fluid.

4. In combination with an aircraft of the type having a fuselage supported on a wheeled frame arranged so that a cargo can be placed below said fuselage; a pair of hoister elements each comprising a fluid operated strut-like element of adjustable length articulated to said frame at one and provided at its other end with a releasable fluid operated gripper to grasp a cargo, said pair of hoister elements being located one at each side of the space to be occupied by said cargo below said fuselage, two extensible and contractable strut-like elements associated with each hoister, said strut-like elements being articulated to each said hoister element at one end and their other ends being articulated to spaced points of said wheeled frame so that each hoister element and two strut-like elements form a tripod to rigidly support the cargo in position, and ancillary strut-like fluid operated hoisters each of adjustable length articulated to said frame at one end and provided at the other with a fluid operated gripper to engage and hold the cargo.

5. In a helicopter, a fuselage, a frame supporting said fuselage, said frame having laterally spaced side portions providing a space under said fuselage to accommodate a cargo in the form of a land vehicle or the like below the fuselage and between said spaced side portions, a fluid operated strut-like hoister articulated to each of said side portions at one end adjacent one end of said space, each having a fluid operated gripper at its other end to engage said cargo, and a similar fluid operated strut-like hoister articulated to each said side portion at one end of said hoister adjacent the other end of said space and each provided with a similar gripper at its other end, and a pair of positioning hydraulic struts articulated to said similar strut-like hoisters and to said frame to form a tripod to positively locate the said grippers to positively fix the location of said cargo with respect to said frame and fuselage.

6. A cargo hoister and positioner element for securing cargo under the fuselage of a helicopter or the like of the type providing a chassis that straddles the cargo, said cargo hoister and positioner comprising a fluid operated extensible and retractable rod hoister articulated to said chassis at one side thereof, a pair of fluid operated extensible and retractable rod strut elements articulated to said rod hoister and to said chassis at spaced points to form a tripod, fluid actuated gripper means rigidly mounted on the end of said rod hoister to engage a complementary element on said cargo, and lock means to lock said rod hoister and said rod struct elements in an adjusted position whereby said cargo is fixed rigidly and accurately with respect to said chassis.

References Cited

UNITED STATES PATENTS

| | | | |
|---|---|---|---|
| 1,480,257 | 1/1924 | Gerlinger | 214—392 X |
| 3,176,940 | 4/1965 | Echeverria | 244—137 |

FOREIGN PATENTS 863,686  3/1961  Great Britain.

MILTON BUCHLER, *Primary Examiner.*

T. W. BUCKMAN, *Assistant Examiner.*

U.S. Cl. X.R.

214—394